United States Patent

[11] 3,568,036

[72] Inventor Harold B. Rosenberg
New City, N.Y.

[21] Appl. No. 885,178
[22] Filed Dec. 15, 1969
[45] Patented Mar. 2, 1971

[73] Assignee Electronic Devices, Inc.
Yonkers, N.Y.

[54] VOLTAGE-MULTIPLIER ASSEMBLY
7 Claims, 4 Drawing Figs.

[52] U.S. Cl. .......... 321/15, 317/101
[51] Int. Cl. .......... H02m 7/10, H02b 1/04
[50] Field of Search .......... 321/15; 29/627, (Inquired); 317/10 (C), 101 (CC), 101 (CP), (Inquired)

[56] References Cited

UNITED STATES PATENTS

| | | | |
|---|---|---|---|
| 2,369,772 | 2/1945 | Bouwers | 321/15 |
| 2,823,347 | 2/1958 | Procter | 321/15 |
| 2,850,681 | 9/1958 | Horton | 317/101 |
| 2,985,812 | 5/1961 | Peterson | 321/15 |

*Primary Examiner*—William H. Beha, Jr.
*Attorney*—Michael Ebert

ABSTRACT: A voltage-multiplier assembly in which a network of solid-state diodes and capacitors are wired together and held securely at separated positions by an insulating matrix having upper and lower rows of spaced tines which define bays for accommodating the capacitors, the tines in the upper row being displaced with respect to the tines in the lower row whereby the capacitors in the bays are in staggered relation. The diodes connected to the capacitors in the bays are protectively embedded in the tines.

PATENTED MAR 2 1971 3,568,036

INVENTOR.

HAROLD B. ROSENBERG

BY

ATTORNEY

VOLTAGE-MULTIPLIER ASSEMBLY

RELATED APPLICATION

This application is related to my copending application Ser. No. 759,125, filed Sept. 11, 1968, U.S. Pat. No. 3,493,840, on "Regulated Voltage-Multiplier System."

BACKGROUND OF INVENTION

This invention relates generally to rectifying systems for producing high direct-voltages, and more particularly to a compact voltage-multiplier assembly for converging a pulsatory low-voltage into a relatively high direct-voltage.

In modern television receivers, a high direct-voltage is usually derived from the horizontal deflection circuit. A winding extension on the horizontal output transformer is connected to a half-wave rectifier of the vacuum tube-type, which supplies the high voltage for the cathode ray tube. Since the high-voltage requirements for a television receiver lie in the range of 20,000 to 25,000 volts, the transformer required to supply a voltage at this level is relatively massive and expensive.

With the growing trend toward more compact TV receivers, and the use of solid-state rather than vacuum-tube circuits, existing high-voltage supplies are not compatible with this purpose. Moreover, because the rectifier tube in a TV receiver operates at an exceptionally high voltage, the accelerated electron stream therein which strikes the anode of the tube tends to generate X-rays that constitute a serious hazard to personnel in the vicinity of the receiver.

In recent studies dealing with the danger of X-rays in TV receivers, the high-voltage tube has been pointed to as a major source of such radiation. While such radiation can be reduced to safer level by the use of shielding, this adds to the cost of the receiver and makes a more compact design even more difficult to attain.

In the above-identified copending application there is disclosed a voltage-multiplier system for converting a pulsatory low voltage, such as is obtained from the horizontal output transformer of a TV receiver, into a relatively high direct-voltage. The system is comprised of a LADDER voltage-multiplier having intercoupled stages in cascade relation, the first stage being connected to the pulsatory source.

Each stage is constituted by a charging capacitor in series with a solid-state diode, the diodes in alternate stages being reversed with respect to the diodes in the other stages. The alternate set of diodes in the multiplier serve as blocking diodes, while the other set of diodes is conductive during the pulse cycles, and serve, therefore, as rectifying devices to charge the capacitors associated therewith. The resultant direct high-voltage has a value determined by the voltage of the low-voltage pulses multiplied by a number equal to the number of rectifying diodes.

In multiplier systems of the type disclosed in the above-identified application as well as in the other known voltage multiplier circuits constituted by a network of solid-state diodes, capacitors and other circuit elements, such as resistors, because of the high voltages involved it is essential that the various components of the system by physically separated from each other to prevent voltage flash-overs and to avoid leakage paths therebetween.

Moreover, since the multiplier system may be incorporated in a compact television receiver in which only a very limited space is available for the voltage multiplier, it is also necessary that the various components of the system be assembled within a small container. This creates certain practical difficulties, for the need to maintain adequate separation between the components is in conflict with the requirement that they be crowded in a container of limited volume.

Though attempts have been made to wire together the diode and capacitor elements of the multiplier system while maintaining the minimum spacing therebetween compatible both with space limitations and high voltage requirements, and to then pot the assembly within a suitable container, this technique leaves much to be desired, for it requires that great care be exercised in the wiring and potting operations to avoid displacement of components. Because of the skills and time involved, the production of such assemblies is not only expensive, but despite the care exercised, one could not be certain that the various components, without exception, were in their proper separated positions.

SUMMARY OF INVENTION

In view of the foregoing, it is the main object of this invention to provide a voltage multiplier system in which the solid-state diodes and capacitors constituting the multiplier are securely held in spaced relation to each other in a highly compact assembly.

More particularly, it is an object of the invention to provide an assembly of the above-identified type in which the diodes are silicon rectifiers, the diodes being protectively embedded in an assembly matrix formed of a material that is nonreactive with silicon.

While the invention will be described herein in connection with voltage multipliers for TV receivers, it will be appreciated that the assembly is useable in connection with any circuit formed by capacitors, solid-state devices, resistors and other elements which must be physically separated from each other, and yet assembled within a relatively small volume.

Briefly stated, the objects are attained in an assembly in which a network of solid-state diodes and capacitors or other elements are wired together and held securely at separated positions in an insulating matrix having upper and lower rows of spaced tines which define bays for accommodating the capacitors, the tines in the upper row being displaced with respect to the tines in the lower row whereby the capacitors in the upper bays are staggered with respect to those in the lower bays, the diodes being protectively embedded in the tines.

OUTLINE OF DRAWING

For a better understanding of the invention, as well as other objects and features thereof, reference is made to the following detailed description to be read in conjunction with the accompanying drawing, wherein:

FIG. 1 is a schematic diagram of a standard voltage multiplier system;

FIG. 2, in perspective, shows a multiplier system in accordance with the invention in which the components of the system are assembled on a matrix;

DESCRIPTION OF INVENTION

Figures 1, 2, 3:
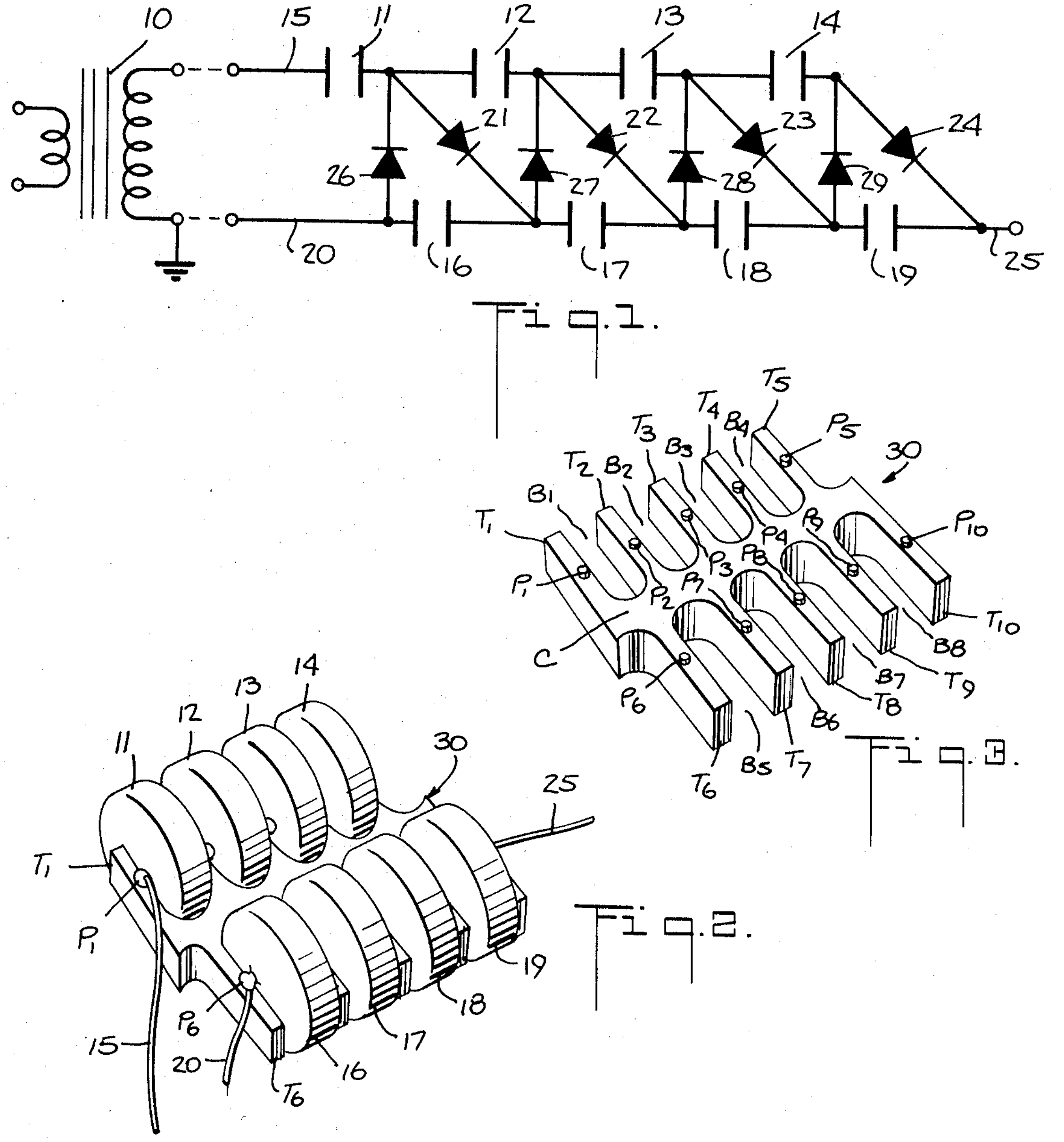
FIG. 3 is a perspective view of the matrix without the capacitors.

Referring now to FIG. 1, there is shown a system for converting a low-voltage, pulsatory source into a relatively high direct-voltage. The pulsatory source may be the horizontal output transformer 10 of a TV receiver, which ordinarily is required to provide fly-back pulses which, when half-wave rectified, produce a direct-voltage in the 20,000 to 25,000 volt range.

In lieu of a transformer suitably dimensioned for such purposes, the transformer 10 may be proportioned to provide only a 6,000 volt output, the transformer in this instance operating with a quadrupler rectification circuit providing an output of 24,000 volts.

A single-phase voltage multiplier rectification circuit of conventional design is capable of supplying rectified or DC potentials exceeding the peak value of an applied alternating voltage, and of achieving this greater voltage without the need for bulky, expensive power transformers. Using the principles of the voltage multiplier rectification circuit, there is no theoretical limit to the maximum voltage which can be obtained. However, most practical applications limit the use of these circuits to arrangements providing three to four times the peak value.

In the arrangement shown in the diagram, the schematic arrangement is that of a four-stage Ladder voltage multiplier circuit using solid-state diodes which, with an applied alternating voltage, will multiply the input to four times the peak value thereof. However, this circuit is used in conjunction with a pulsatory rather than an alternating voltage source, and functions in this context to multiply the peak value of the input by a factor of three.

The multiplier circuit is constituted by a first series-connected chain of four capacitors 11, 12, 13 and 14, having an input terminal 15 for connection to one end of the secondary of transformer 10, and a second series-connected chain of four capacitors 16, 17, 18 and 19 having an input terminal 20 for connection to the other (grounded) end of the secondary.

Connected between the junctions of the capacitors in the first and second chains are solid-state diodes 21, 22 and 23, and connected between the output end of the first chain and the output end of the second chain is a solid-state diode 24 which leads to a DC output, high-voltage terminal 25. Connected between the output electrode of the capacitors 11 to 14 in the first chain and the input electrode of the capacitors 16 to 19 in the second chain are solid-state diodes 26, 27, 28 and 29, the polarity of these diodes being reversed with respect to diodes 21 to 24, so that one set of diodes acts as rectifier elements and the other set as blocking elements.

The solid-state diodes may be of the selenium or silicon type. In practice, where the diode performs a blocking function in the multiplier circuit, selenium may be used, and where the diode performs a rectifying function, the more expensive silicon diode may be used.

Selenium diodes are made by placing a thin layer of selenium on a backing plate which serves as one electrode. The outer surface of the selenium layer is then treated to form a barrier layer which enhances its blocking characteristics, a pressure or sprayed metal electrode placed thereover providing the second contact. Selenium diodes have relatively high reverse leakage. Their forward conductance and rectification efficiency are much lower than silicon devices. The selenium rectifier, however, is noted for its ability to withstand large momentary circuit overloads and surges of excessive back voltage.

Silicon junction diodes are available in alloy, grown or diffused types of structures. They are of particular interest because of their very low reverse leakage and saturation currents, and their ability to withstand higher temperatures than germanium or selenium.

Because of the advantages of silicon diodes over those of selenium, in an assembly in accordance with the invention, silicon diodes are used in all instances in the circuit.

Figure 4:
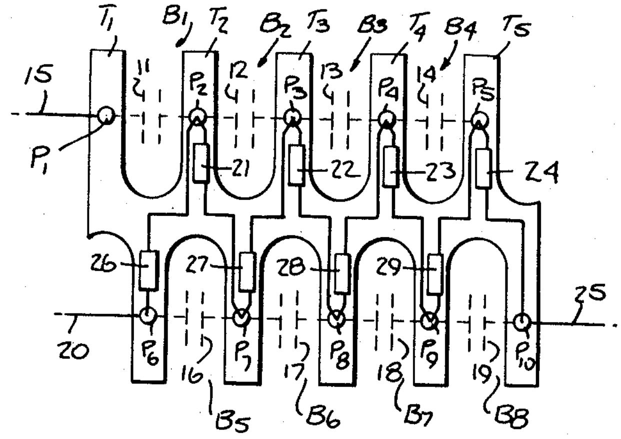
FIG. 4 is a section of the matrix taken in the longitudinal plane indicated by lines 4—4 in FIG. 3 to expose the diodes embedded therein.

As shown in FIGS. 2, 3 and 4, the assembly makes use of an insulating matrix generally designated by numeral 30 and constituted by a central core C having an upper row of equispaced tines $T_1$, $T_2$, $T_3$, $T_4$ and $T_5$ and a lower row of equispaced tines $T_6$, $T_7$, $T_8$, $T_9$ and $T_{10}$, the tines in the lower row being displaced from those in the upper row so that their longitudinal axis extends through the center of the space between adjacent upper tines.

The spaces between the tines in the upper row define four bays, $B_1$, $B_2$, $B_3$ and $B_4$, while those between the tines in the lower row define four bays $B_5$, $B_6$, $B_7$ and $B_8$. Mounted on the upper tines are terminal pins $P_1$, $P_2$, $P_3$, $P_4$ and $P_5$ mounted in the lower tines are pins $P_6$, $P_7$, $P_8$, $P_9$ and $P_10$. The capacitors are all encased in circular wafers formed of an insulating plastic material whose thickness is slightly less than the width of the bays, whereby the capacitors may be readily inserted therein. Thus capacitors 11 to 14 are inserted in bays $B_1$ to $B_4$ and are connected in series between pins $P_1$ to $P_5$, whereas capacitors 16 to 19 are inserted in bays $B_5$ to $B_8$ and connected in series between pins $P_6$ to $P_{10}$. 10.

The tines therefore act to maintain a fixed spacing between the capacitors in the upper and lower series and to prevent displacement thereof, the capacitors in the upper row being staggered with respect to those in the lower row and being spaced by core C to maximize the separation therebetween.

Embedded in tines $T_2$, $T_3$, $T_4$ and $T_5$ are diodes 21, 22 and 23 and 24, respectively, while embedded in tines $T_6$, $T_7$, $T_8$ and $T_9$ are diodes 26, 27, 28 and 29, respectively, the diodes in the lower tines being staggered with respect to those in the upper tines to maximize the separation therebetween. The diodes are internally interconnected within the body of the matrix.

The matrix is molded or cast from an epoxy material having a high dielectric constant, the epoxy being made with an amine-free catalyst, nonreactive with silicon so as not to impair the properties thereof. Preferably the catalyst used is pyromellitic dianhydride which does not affect the characteristics of silicon diodes.

Thus before forming the matrix, the diodes are prewired and placed in the mold so that when the matrix is thereafter formed, the diodes are protectively embedded and securely held in their properly separated positions. The capacitors are then inserted in the bays and soldered or otherwise connected to the terminal pins. In addition, depending on the circuit involved, resistors may be connected to the pins. In practice, the assembly constituted by the matrix and diode and capacitor elements may be placed in a suitable container having terminals for the input and output leads, the assembly being potted therein to provide a highly compact and efficient high-voltage multiplier.

While there has been shown a preferred embodiment of the invention, it is to be understood that many changes may be made therein without departing from the essential spirit of the invention. For example, when the multiplier includes only three stages, then the matrix will have four rather than five tines in each row to accommodate the capacitors, and when the multiplier stages are greater than four in number, an appropriate number of tines is provided. Also, while in the matrix shown, the tines in the upper row are staggered or offset with respect to those in the lower row, one may construct a matrix without such offset.

I claim:

1. An assembly for an active circuit formed by solid-state elements which require substantial electrical separation to avoid voltage flash-over, said assembly including a matrix formed of an insulating material having a central core, a first row of equispaced upper tines extending laterally from one side of the core and a second row of equispaced tines extending laterally from the other side of the core at positions which are staggered relative to the upper tines, said elements being embedded in said tines, and terminal pins mounted on said tines and connected to said elements.

2. An assembly as set forth in claim 1, wherein said elements are silicon diodes.

3. An assembly as set forth in claim 1, wherein said active circuit is a voltage multiplier whose circuit is constituted by a network of solid-state diode elements and capacitors, the capacitors being connected between said pins and being inserted in the bays defined by said tines.

4. An assembly as set forth in claim 2, wherein said matrix is formed of an epoxy material made with an amine-free catalyst.

5. An assembly as set forth in claim 4, wherein said catalyst is pyromellitic dianhydride.

6. An assembly as set forth in claim 3, wherein said capacitors are encased in plastic wafers whose thickness substantially corresponds to the width of the bays.

7. An assembly for an active circuit formed by solid-state elements which require substantial electrical separation to avoid voltage flashover, said assembly including a matrix formed of an insulating material having a central core, a first row of equispaced upper tines extending laterally from one side of the core and a second row of equispaced tines extending laterally from the other side of the core, said elements being embedded in said tines, and terminal pins mounted on said tines and connected to said elements.